US012603835B2

(12) United States Patent　　　(10) Patent No.:　US 12,603,835 B2
Nandy et al.　　　　　　　　　　　(45) Date of Patent:　Apr. 14, 2026

(54) RESOURCE OPTIMIZATION IN MULTICAST NETWORK ENVIRONMENTS

(71) Applicant: HEWLETT PACKARD ENTERPRISE DEVELOPMENT LP, Spring, TX (US)

(72) Inventors: Tathagata Nandy, Karnataka Bangalore (IN); Chethan Chavadibagilu Radhakrishnabhat, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 608 days.

(21) Appl. No.: 18/154,094

(22) Filed: Jan. 13, 2023

(65) Prior Publication Data

US 2024/0243993 A1　　Jul. 18, 2024

(51) Int. Cl.
*H04L 45/28*　　　(2022.01)
*H04L 45/16*　　　(2022.01)

(52) U.S. Cl.
CPC .............. *H04L 45/28* (2013.01); *H04L 45/16* (2013.01)

(58) Field of Classification Search
CPC ... H04L 43/0805; H04L 45/16; H04L 45/245; H04L 45/28
See application file for complete search history.

(56) References Cited

U.S. PATENT DOCUMENTS

| | | | | |
|---|---|---|---|---|
| 9,806,895 | B1 * | 10/2017 | Kommula | ............... H04L 47/32 |
| 2018/0041555 | A1 * | 2/2018 | Manohar | ................. H04L 45/16 |
| 2021/0067988 | A1 * | 3/2021 | Daneshvar | ............ H04W 16/14 |
| 2021/0099380 | A1 * | 4/2021 | Suryanarayana | ....... H04L 12/18 |
| 2024/0031272 | A1 * | 1/2024 | Ganesan | ............... H04L 45/127 |

* cited by examiner

*Primary Examiner* — Donald L Mills
(74) *Attorney, Agent, or Firm* — Jones Robb PLLC

(57)　　　ABSTRACT

A resource optimization processor is disclosed for inclusion in peer routers. The resource optimization processor performs a method for resource optimization of the routers. The method includes disabling an inter-switch link (ISL) between peer routers and monitoring downstream links between a primary router and downstream devices connected to the primary router. The method further includes identifying a failure of at least one downstream link and enabling the ISL between the first router and the second router for the failed downstream link upon identification of the failure.

20 Claims, 6 Drawing Sheets

400

DISABLE INTER-SWITCH LINK
410

MONITOR DOWNSTREAM LINKS
420

ENABLE INTER-SWITCH LINK OR CHANGE
ACTIVE ROUTER BASED ON STATUS OF
DOWNSTREAM LINKS
430

500

MONITOR DOWNSTREAM LINKS
510

IDENTIFY FAILED DOWNSTREAM LINK
520

ENABLE INTERSWITCH LINK BASED ON IDENTIFICATION OF FAILED LINK

530

STORE TOTAL NUMBER OF FAILED DOWNSTREAM LINKS
540

COMPARE TOTAL NUMBER OF FAILED DOWNSTREAM LINKS TO THRESHOLD TO DETERMINE ACTIVE ROUTER
550

RESOURCE OPTIMIZATION IN MULTICAST NETWORK ENVIRONMENTS

INTRODUCTION

Various protocols and architectures have evolved for routing multicast traffic. For example, with respect to protocols, both Internet Group Management Protocol (IGMP) and Protocol Independent Multicast (PIM) are used to route multicast traffic in a network. IGMP is a protocol that allows several devices to share one IP address so they can all receive the same data. PIM is a known family of protocols that enables the delivery of a stream of information to multiple select destinations within a network without the source device needing to send multiple messages separately addressed to the individual recipients (as would occur with unicast traffic) and also without the messages being sent to every client in the network indiscriminately (as would be the case with broadcast messages). Instead, recipients subscribe to a multicast group associated with a given source of multicast traffic by sending "Join" messages to PIM-enabled networking devices (hereinafter "PIM devices"), and then the PIM devices in the network utilize the protocol to determine paths from the source to those clients that have subscribed to the group. PIM is often employed for applications where it is desired to send a stream of data, such as a video stream, to multiple clients simultaneously, such as closed circuit television (CCTV) applications where a video stream from a camera may be sent to multiple monitoring stations.

Further, with respect to architectures for routing multicast traffic while maintaining high availability and reliable access, various solutions have evolved. One such solution is Virtual Switching Extension (VSX) architecture, which has been designed to provide high availability and robust performance. High availability (HA) refers to a system or component that is continuously operational for extended periods of time, without disruption to network access or performance. VSX solves high availability challenges by utilizing features such as multi-chassis link aggregation (MC-LAG) to provide a distributed and redundant architecture that is highly available, with minimal traffic loss. In the VSX topology, an Inter-Switch Link (ISL) is a layer 2 interface between two peer routers or switches. Each of the peer routers receives packets from a source and each peer router is configured with an ISL link connected to its peer VSX router. One of the peer routers may function as a primary router and the other peer is secondary router. When multicast is enabled on a pair of VSX peer routers, the primary router may also act as the designated router (DR) under the multicast protocol while the secondary router may act as a proxy router (PR) under the multicast protocol. The ISL interface is by default a member of all virtual local area networks (VLANs) on the peer routers. The network may utilize any of a number of protocols, such as those described above, to transmit and receive multicast packets.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

DETAILED DESCRIPTION

Figure 1:
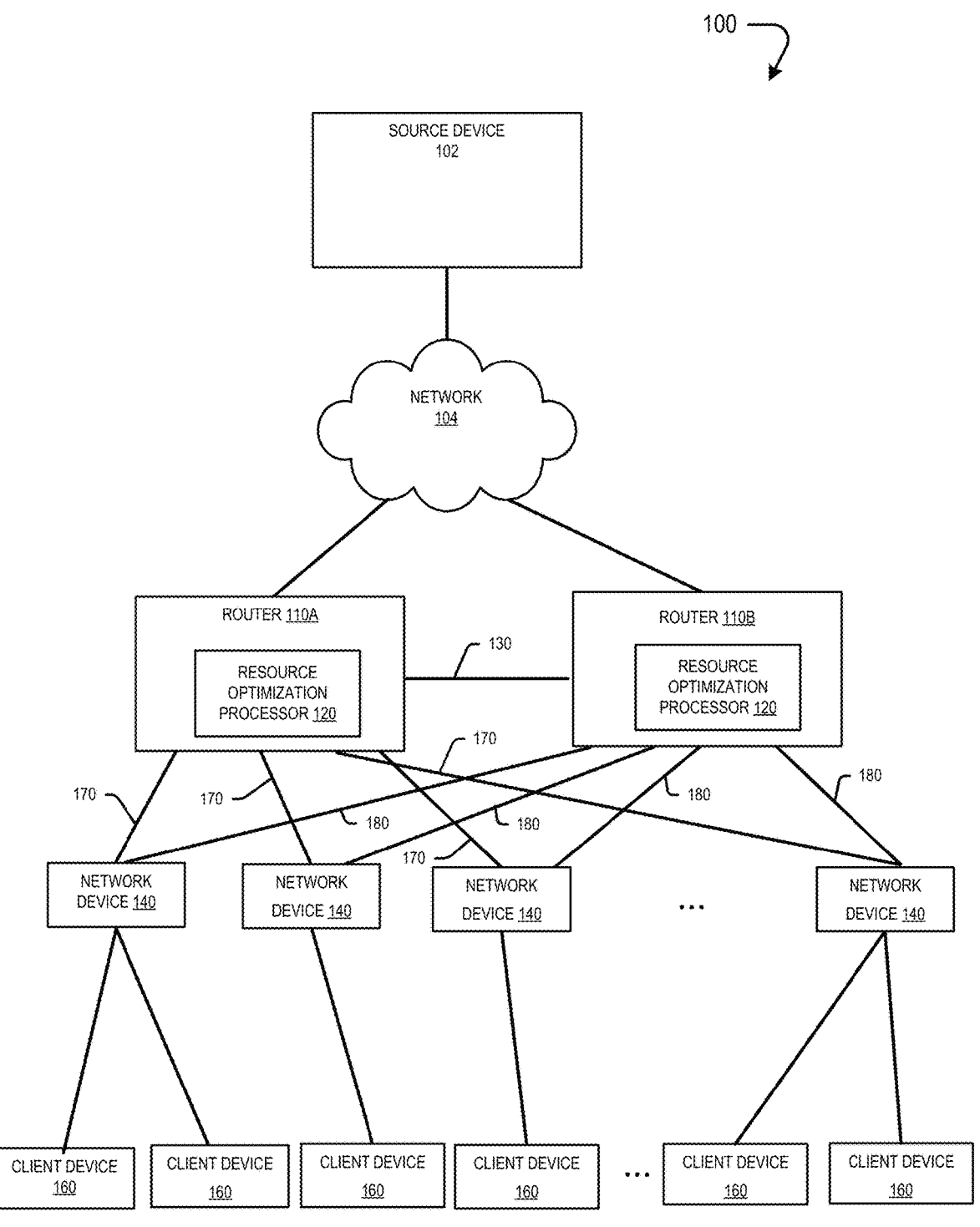
FIG. 1 is a block diagram illustrating a resource optimization processor operating within a multicast networking environment in accordance with examples set forth herein.

As noted above, various protocols and architectures have evolved for routing multicast traffic. In particular, both Internet Group Management Protocol (IGMP) and Protocol Independent Multicast (PIM) are used to route multicast traffic in a network. Additionally, solutions for providing high availability during routing of multicast traffic have evolved. For example, VSX architecture has been designed to provide high availability by providing redundancy by implementing peer routers connected by an inter-switch link (ISL).

While the above-described redundancy provided by the use of peer routers in routing solutions for multicast traffic contributes to high availability, it also may result in excessive consumption of resources, particularly when used in combination with multicast traffic. For example, if multicast is enabled with peer VSX routers, each will have both a multicast routing information base (MRIB) and a multicast forwarding information base (MFIB), both of which are described below. Moreover, the primary router may send duplicates of multicast packets received from a multicast source over the ISL to the secondary router, and as a result the secondary router may end up storing a very large number of bridge entries in its MFIB. The number of bridge entries in the MFIB of the secondary router can be multiple times more than the number of entries in the MFIB of the primary router. This large number of bridge entries in the secondary router's MFIB entries can quickly overwhelm the limited resources of the secondary router. How this multiplication of entries in the MFIB of the secondary router occurs will be described in greater detail below.

To address the issues noted above, as well as other issues described herein, example routers are provided. Although referred to for convenience herein as a "router," usage of this terminology is not intended to be limiting. In some instances, a distinction may be drawn between routers and switches, with the former being layer-3 devices and the latter being layer-2 devices, but as some switches have gained some layer-3 functionalities this distinction is not always applicable. Thus, in some examples the router could be a switch (e.g., a layer-3 switch) notwithstanding being referred to herein for convenience as a router. Routers disclosed herein may, for example, be PIM routers (i.e., routers capable of utilizing the PIM protocol). In some examples, routers may be configured to utilize other multicast protocols (e.g., IGMP or others), in addition to or instead of PIM. In addition, routers described herein may be arranged to operate in a VSX architecture with the peer routers being configured to operate as a pair of VSX peer routers. However, the provision of other types of routers is within the scope of the disclosure and any routers or switches capable of routing information in the native protocol of the corresponding network may be used. The example routers disclosed herein are configured to, among other things, selectively disable duplication of packets over the ISL when multicast is enabled. This prevents the bridge entries from being added to the MFIB of the secondary router, thus avoiding the overwhelming of the secondary router resources. Additional aspects of examples disclosed herein are described in greater detail below.

The MRIB serves as the communication channel between MRIB clients such as PIM, IGMP, and the MFIB. The MRIB will include a number of entries, each associated with a multicast flow and including information indicating a source S, a group G, and incoming and outgoing interfaces. Thus, programming entries in the MRIB includes specifying a particular source S and group G for a multicast route (mroute). This combination of a particular source and group may be referred to herein as an (S, G) multicast flow. Programming the multicast route for a given (S, G) multicast flow also includes specifying an incoming interface at which data associated with the flow is expected to be received and a list of outgoing interfaces to which the data from that flow is to be forwarded.

The MFIB is a forwarding engine that forwards received multicast packets based on entries stored therein. The MFIB registers with the MRIB, and then entries are generally programmed into the MFIB based on the entries in the MRIB. For example, if a new multicast route is programmed into the MRIB, then generally a corresponding multicast route entry is also programmed into the MFIB to ensure proper forwarding of the packets. However, in the case of a secondary router, the MRIB entries are prevented from being propagated down into the MFIB so as to avoid having the secondary router forward duplicates of the multicast packets to the downstream devices (since the primary router is already forwarding those packets). Moreover, when the primary router forwards duplicate packets to the secondary router over the ISL, the secondary router may program a bridge entry into its MFIB for each interface associated with the duplicated packets. Thus, while the MRIB entries in peer routers will be identical, they will have different MFIB entries—the primary router's MFIB will have regular mroute entries that match the entries in its MRIB, whereas the secondary router's MFIB will have only bridge entries. Generally, the bridge entries programmed into the MFIB in the secondary peer router will greatly exceed the number of entries in the MFIB in the primary peer router.

For example, suppose the primary router has two mroute entries, each designating multiple outgoing interfaces, such as is indicated in Table 1 below. In this case, there will also be two corresponding mroute entries in the MFIB of the primary router and also in the MRIB of the secondary router. However, because of the duplicate transmission over the ISL the secondary router will have bridge entries for each of the outgoing interfaces specified in the mroutes of the primary router, as shown in Table 2 below. The number of MFIB entries in the secondary router is a function of the number of outgoing interfaces in the mroutes of the MRIB/MFIB of the primary router, as the MFIB of the secondary router will have a bridge entry for each such outgoing interface. Moreover, because each mroute entry in the primary router can specify multiple outgoing interfaces (e.g., see Table 1), the number of bridge entries in the MFIB of the secondary router may greatly exceed the number of mroutes in the primary router's MRIB. Thus, with even relatively small numbers of mroutes, the number of bridge entries in the MFIB of the secondary router can quickly become very large.

TABLE 1

| Incoming Interface | Source Address | Group Address | Outgoing Interface(s) |
|---|---|---|---|
| 1/1/1 | S1 | G1 | Vlan 10, vlan 20, vlan 30, vlan 40, vlan 50 |
| 1/1/1 | S2 | G2 | vlan 10, vlan 20, vlan 70, vlan 80, vlan 90, vlan 100 |

In the bridge entries in the MFIB of the secondary router, the outgoing interfaces from the MRIB are listed as incoming interfaces having no outgoing interface as illustrated in Table 2 below.

TABLE 2

| Incoming Interface | Source Address | Group Address | Outgoing Interface(s) |
|---|---|---|---|
| vlan 10 | S1 | G1 | None |
| vlan 20 | S1 | G1 | None |
| vlan 30 | S1 | G1 | None |
| vlan 40 | S1 | G1 | None |
| vlan 50 | S1 | G1 | None |
| vlan 10 | S2 | G2 | None |
| vlan 20 | S2 | G2 | None |
| vlan 70 | S2 | G2 | None |
| vlan 80 | S2 | G2 | None |
| vlan 90 | S2 | G2 | None |
| vlan 100 | S2 | G2 | None |

The excessive number of entries in the MFIB of the secondary router results in a depletion of hardware resources. Furthermore, each packet is unnecessarily copied from the primary router to the secondary router for each outgoing interface over ISL, but is simply dropped at the secondary router, thus resulting in a further waste of resources.

Accordingly, examples disclosed herein provide a resource optimization processor for each router and peer router in order to conserve hardware resources and avoid excessive duplication. The resource optimization processor may be integrated with the routers. For example, the resource optimization processor may be integrated with a first router and is programmed to selectively disable the ISL between the first router and a second peer router when multicast is enabled, thereby preventing a flow of replication packets from the first router to the second router. Because the replication packets over the ISL are prevented, the resultant bridge entries in the MFIB of the secondary router are prevented. The disabling of the ISL is "selective" in the sense that the ISL may be disabled for certain interfaces but enabled for others, as is described in greater detail below. Initially, the ISL may be disabled for all interfaces, but may be re-enabled for certain interfaces under certain circumstances. The disabling of the ISL may occur, for example, by enabling IGMP snooping. IGMP snooping is a method that network routers use to identify multicast groups, which are groups of computers or devices that all receive the same network traffic, but one side effect of enabling such snooping in a VSX pair is that enabling snooping disables the ISL. In examples provided herein, the first router initially functions as a designated router (DR) or primary router and the second router functions as a proxy router (PR) or secondary router. In other words, while the first router is primary, the second router is secondary.

The resource optimization processor is also programmed to monitor downstream links, e.g., Virtual Local Area Networks (VLANs), which divide a single existing physical network into multiple logical networks. VLAN tunnels operate between the first router and downstream devices connected to the first router. The monitoring of the VLAN tunnels may occur, for example, by consultation of the resource optimization processor with a remote database. As a result of the monitoring, the resource optimization processor is able to identify a failure of at least one downstream link between the first router and the downstream devices. Upon identification of this failure, the resource optimization processor enables the ISL between the first router and the second router for the failed downstream link in order to ensure that the information intended to be transmitted over the failed downstream link reaches the downstream devices (via the ISL and the secondary router). It should be noted that, in examples provided herein, the primary router enables the ISL for the failed downstream link only and not for the downstream links that remain active. Thus, the secondary or proxy router will publish bridge entries to the MFIB for the failed downstream interface or VLAN only. On the other hand, if no failures of downstream links from the first router are identified, the ISL remains disabled for all links in order to conserve hardware resources. Enabling the ISL for a given interface (link) may comprise tagging the ISL as an egress port for that interface, so that packets destined for that interface are duplicated to the ISL, whereas disabling the ISL for a given port may comprise omitting or removing the ISL as an egress port for the given interface.

In further examples, the resource optimization processor identifies a failure of a threshold number of downstream links from the first router to the downstream devices. The threshold number may be defined, for example, by a percentage, such as 50% or another percentage of the number of existing links between the first router and the downstream devices. Upon identification of this threshold number, the resource optimization processor instructs the first router to operate as a secondary router or PR and instructs the second router to operate as a primary router or DR. Thus, based on the status of links between peer routers and downstream devices, the resource optimization processor both determines when ISL is enabled or disabled between peer devices and further determines which peer device operates as a primary router and which peer devices operates as a secondary router.

Turning now to the figures, various devices, systems, and methods in accordance with aspects of the present disclosure will be described.

FIG. 1 is a block diagram illustrating a resource optimization processor 120 operating within a multicast networking environment 100 in accordance with examples set forth herein. Network environment 100 may include a source device 102, network 104, peer routers 110A and 110B, network devices 140 and client devices 160. Each peer router 110A and 110B may include a resource optimization processor 120. The resource optimization processor 120 may be identical on each of the peer routers 110A and 110B and may include software and hardware configured to optimize hardware resources between the peer routers 110A and 110B. The network 104 may utilize various multicast protocols, such as for example PIM protocols or IMPG protocols.

Although only one source device 102 is shown, multiple source devices 102 may be connected over the network 104. The source device 102 may be or include any device capable of generating and distributing a multicast stream over the network 104. Network 104 may be or include any type of network configured for distribution of multicast traffic.

Each peer router 110A, 110B (collectively referenced as 110) connects over the network 104 with network devices 140. For example, router 110A connects with network devices 140 over interfaces 170 and the router 110B connects with the network devices over interfaces 180. The routers 110 may be, for example, layer-3 networking devices, and may operate as, for example, a border gateway. Although referred to for convenience herein as a "router," usage of this terminology is not intended to be limiting. In some instances, a distinction may be drawn between routers and switches, with the former being layer-3 devices and the latter being layer-2 devices, but as some switches have gained some layer-3 functionalities this distinction is not always applicable. Thus, in some examples the routers 110 could be a switch (e.g., a layer-3 switch) notwithstanding being referred to herein for convenience as a router. In the illustrated example, the peer routers 110A, 110B may, for example, be PIM routers (i.e., routers capable of utilizing the PIM protocol). In some example, the routers 110 may be configured to utilize other multicast protocols (e.g., IGMP or others), in addition to or instead of PIM. In addition, the network devices 140 and routers 110 may be arranged to operate in a VSX architecture with the peer routers 110A and 111B being configured to operate as a pair of VSX peer routers. Aspects of this VSX architecture may include the provisioning of an interswitch link (ISL) 130 between the peer routers 110 and multi-chassis link aggregation (MC-LAG) between the network devices 140 and routers 110, as will be described in greater detail below. However, the provision of other types of routers is within the scope of the disclosure and any routers or switches capable of routing information in the native protocol of the corresponding network 104 may be used. The peer routers 110A and 110B may have identical components and information. A difference between the peer routers is that when multicast is enabled on the pair of routers 110, one of the routers 110 (e.g., the router 110A) acts as a primary router and the designated router (DR) under the multicast protocol while the other one of the routers 110 (e.g., the router 110B) acts as a secondary router and the proxy router (PR) under the multicast protocol, and in the secondary/PR router the data traffic forwarding function for multicast traffic is disabled such that mroute states are not loaded into the hardware of the secondary router (e.g., mroute entries in the MRIB of the secondary router are not propagated into the MFIB). Instead, all multicast traffic forwarding is handled through the primary router or DR 110A. It should be understood that in accordance with the forwarding function, primary router 110A may copy or publish multicast router information from an MRIB (also referred to herein as a centralized database) of the router 110A into the MFIB of the router 110A in order to program switching hardware of the corresponding router 110A.

The peer routers 110 are connected by an interswitch link (ISL) 130. The ISL 130 is a layer 2 interface between the two peer routers 110. In examples provided herein, the ISL 130 is used for both data path and control path transmission and provides redundancy, so that in the event that one peer router 110 fails, the other peer router 110 stores the same information. When multicast is not enabled, the primary router 110A will tag the ISL 130 as an egress port for each output interface designated in any multicast entries in the MRIB or MFIB of the router 110A, which has the effect of causing any traffic that is destined for those output interfaces to be duplicated to the ISL 130 (i.e., received packets are forwarded both to their destination output interface and also to the interface associated with the ISL 130). When these duplicated multicast packets are sent over the ISL 130 from the primary router 110A to the secondary router 110B, the secondary router 110B creates a bridge entry in the MFIB of the secondary router 110B, with each such bridge entry being associated with a particular output interface, source, and group, but not specifying any output interfaces. As will be described in greater detail below, this function of the ISL 130 may be selectively disabled or enabled based on certain conditions. Such disabling of the duplication of multicast traffic to the ISL 130 may be referred to herein for convenience as "disabling the ISL 130," but this phrasing is not intended to imply that no communication can pass through the ISL 130. Rather, disabling the ISL 130, as that phrase is used herein, refers only to preventing duplication of multicast traffic to the ISL 130 as described above, but other traffic, such as control plane traffic or non-multicast traffic, may still be communicated over the disabled ISL 130 in some examples. Moreover, the enabling and disabling of the ISL 130 may be performed selectively on a per-interface basis, meaning that duplication of multicast traffic over the ISL 130 may be enabled for certain output interfaces while being disabled for other output interfaces. As used herein, general references to disabling the ISL 130 which are not accompanying by any references to particular interfaces should be understood as referring to disabling the ISL 130 for all of the multicast output interfaces, but if one or more specific output interfaces are mentioned or implied in association with the reference to disabling the ISL 130 then it should be understood that the disabling is specially for those mentioned or implied interfaces (but not necessarily all interfaces).

The peer routers 110 each include a resource optimization processor 120 configured to optimize hardware resources of the router 110. In particular, the resource optimization processor 120 of the primary router 110A is configured to selectively disable the ISL 130 when multicast is enabled on the pair of routers 110. This has the effect of preventing the bridge entries in the MFIB of the secondary router 110B, as explained above. The resource optimization processor 120 may also be configured to selectively reenable the ISL 130 for certain interfaces in response to certain conditions, such as a link associated with the interface becoming unavailable. Examples of the hardware resources and the optimization of the hardware resources that can be performed by the resource optimization processor 120 will be further described below with respect to FIGS. 2-6.

The interfaces 170 and 180 may, for example, be virtual interfaces such as VLAN tunnels. In one example, the multiple interfaces 170, 180 may be PIM enabled interfaces. In examples in which the interfaces 170 and 180 are virtual interfaces, the network may also comprise underlying physical hardware (not illustrated), such as communications cables, routers, and other networking devices, upon which the virtual interfaces 170 and 180 are overlaid. As shown in FIG. 1, each network device has one interface 170 connected to the primary router 110A and another interface 180 connected to the secondary router 110B. These may be configured to operate in an MC-LAG configuration according to the VSX architecture.

The network devices 140 may be or include any device capable of receiving a generated multicast stream and distributing the multicast stream to client devices 160. For example, the network devices 140 may be switches, routers, hubs, repeaters, or other networking devices. In some examples, the network devices 140 are configured as layer-2 devices, such as access layer switches. The network devices 140 may further receive requests for multicast streams from the client devices 160. As illustrated, any number of network devices 140 may be incorporated in the networking environment 100. Further, any number of client devices 160 may connect with each network device 140.

Figure 2:
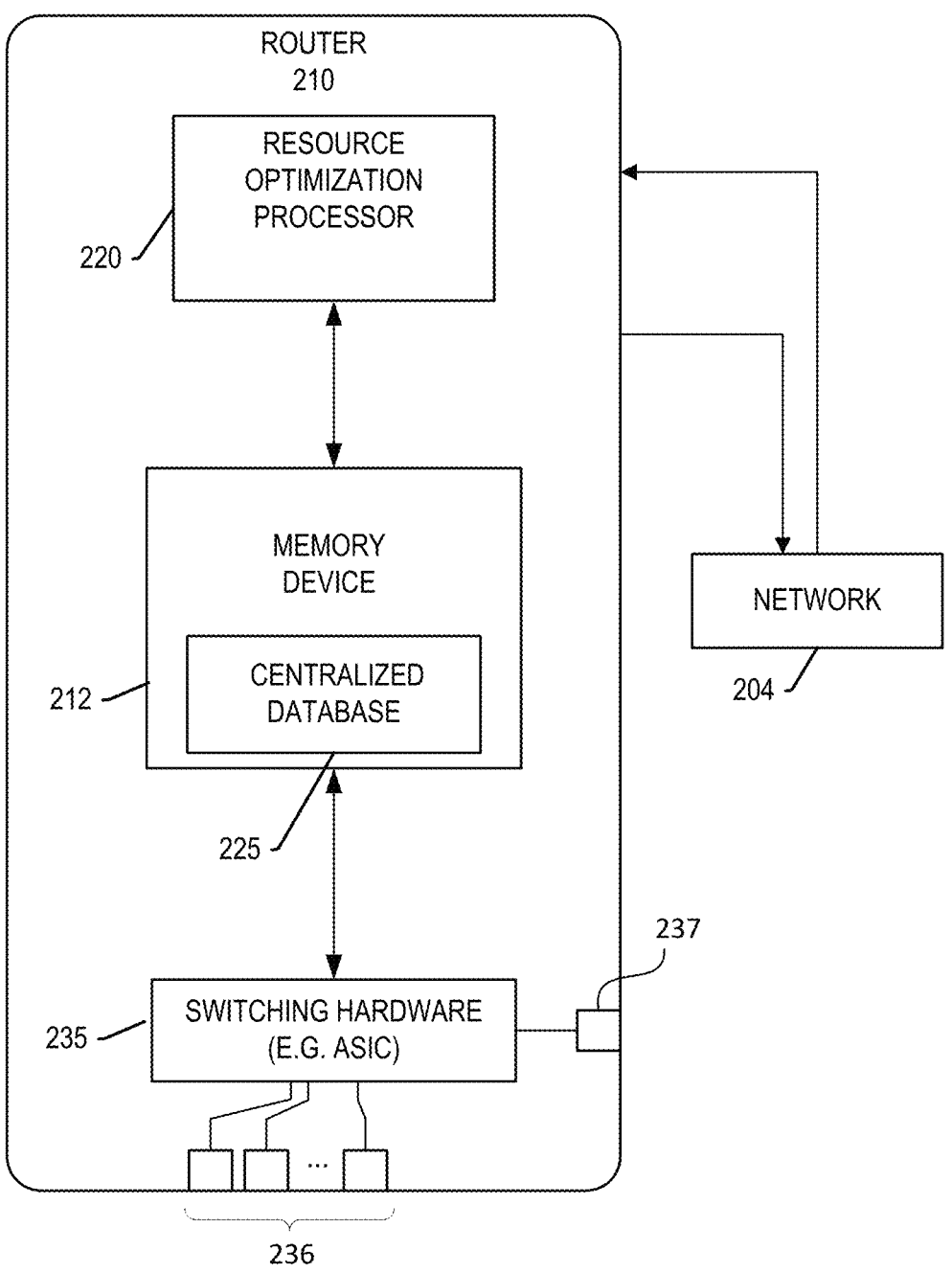
FIG. 2 is a block diagram illustrating a router in accordance with examples set forth herein.
Figure 3:
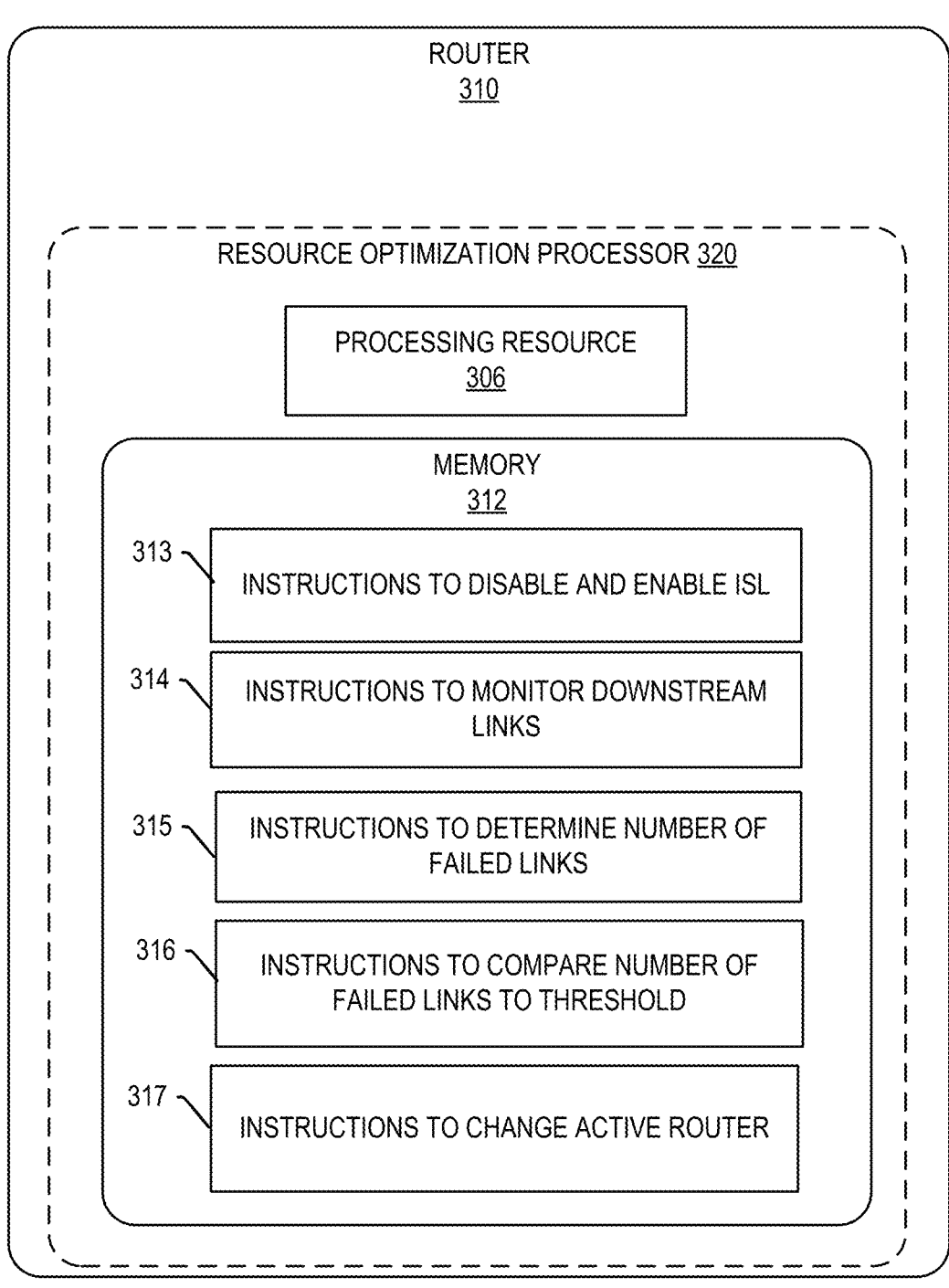
FIG. 3 is a block diagram illustrating details of a router storing instructions in accordance with examples described herein.

FIGS. 2 and 3 illustrate example configurations of a network device functioning as a peer router utilizing a resource optimization processor as described herein. FIG. 2 is a block diagram illustrating a router 210 in accordance with examples set forth herein. The router 210 is one example configuration of the peer router 110. The router 210 may further be described as a computing device, network device, switch, etc. As illustrated, the router 210 may be connected to other computing devices in the network. As used herein, a "computing device" may include a server, a networking device, a chipset, a desktop computer, a workstation, a mobile phone, a tablet, an electronic reader, or any other processing device or equipment.

The router 210 includes a resource optimization processor 220, a memory device 212, and switching hardware 235. In the illustrated example, the resource optimization processor 220 and is connected with a network 204 which may be a network for routing multicast traffic. Network 204 may comprise other computing devices, including networking devices similar to router 210.

Memory device or system 212 may incorporate a centralized database 225 storing network information, such as databases including a multicast routing information base (MRIB) and multicast forwarding information base (MFIB). The memory device 212 may be or comprise one or more memory devices (e.g., RAM, flash memory, battery-backed RAM, a Hard Disk Drive (HHD), etc.), which may include volatile and non-volatile devices. The database 225 is referred to as "centralized" because it is accessible to all components of the border gateway device 202. However, the MFIB and MRIB may be stored in different parts of the memory system 212, for example, the MFIB may be stored in a non-volatile memory (e.g., a ternary content-addressable memory (TCAM)) and the MRIB may be stored in RAM. Moreover, although FIG. 2 illustrates the memory system 212, the switching hardware 235, and the resource optimization processor 220 separately for ease of description, it should be understood that different portions of the memory system 212 may be part of or packaged with different components, including the switching hardware 235 and/or resource optimization processor 220. For example, the MFIB may be stored in non-volatile memory that is part of or packaged with the switching hardware 235, such as a TCAM that is part of an ASIC of the switching hardware 235. As another example, portions of the memory system 212 may store processor executable instructions that configure the resource optimization processor 220 to perform certain operations, and thus these portions of the memory system 212 may be considered as also being part of the resource optimization processor 220.

The centralized database 225 may, for example, be an Open vSwitch Database (OVSDB). Centralized database 225 may store information related to different components in the router 210, including information associated with multicast flows. The different information may be stored in different tables in centralized database 225, including, for example, the MRIB. This information is also accessible for programming the switching hardware 235. Non-limiting examples of information stored may include information regarding addresses for multicast groups (e.g., in an Mroute table), next hop information, etc.

The switching hardware 235 comprises the underlying physical communication pathways that communicate the data, such as the physical interfaces (e.g., ports) and the internal switching fabric that selectively connects these ports together (e.g., a crossbar array or other physical data communication lines). The switching hardware 235 may also comprise control circuitry that controls and enables the aforementioned underlying physical communication pathways. This control circuitry may be or include, for example, an application-specific integrated circuit (ASIC), a field programmable gate array (FPGA), a complex programmable logic device (CPLD), a programmable array logic (PAL), or other type of switching hardware. As noted above, the switching hardware 235 may also comprise memory devices that are also part of the memory system 212, such as a TCAM or other non-volatile memory device storing the MFIB. The router 210 may be configured to program the switching hardware 235 based on the centralized database 225. In other words, the data stored in centralized database 225 controls how the switching hardware 235 operates to forward data, for example controlling which outgoing interfaces will have certain data forwarded to them. More specifically, the MFIB controls which outgoing interfaces will have multicast data forwarded to them, and the MFIB may be programmed based on the contents of the MRIB in the centralized database 225. Other forwarding tables may also be used to control forwarding of other types of data, such as a unicast FIB for unicast data.

Ports 236 and ISL interface 237 are provided for communication between the router 210 and other network devices. As further explained herein, the ISL interface 237 provides for communication between peer routers 210 and is configured to be connected to a peer router to establish an ISL with the peer router. Although only one interface 237 is illustrated, it should be understood that the ISL may be formed via multiple interfaces (e.g., multiple ports). The ports 236 may provide, for example, upstream and downstream physical interfaces to allow for communication between the peer routers 210 and other network devices. The plurality of ports 236 are configured to be coupable to one or more downstream devices to establish downstream links with the downstream devices, such as the links 170 or 180 in FIG. 1. Due to virtualization, the links (e.g., 170 or 180) do not necessarily correspond to the ports 236 on a one-to-one basis (e.g., a single port 236 could carry multiple links). References herein to an "interface" should be understood as broadly including both virtual interfaces (e.g., a VLAN) and physical interfaces (e.g., a physical port 236), unless specifically indicated otherwise. Although the ISL interface 237 is illustrated separately from the ports 236, in some examples the ISL interface 237 may be the same, physically, as the ports 236. In some examples, any port 236 could be used to establish the ISL interface 237, whereas in other examples a dedicated port 236 is reserved for the ISL interface 237. In still other examples, the ISL interface 237 is physically different from the ports 236 (e.g., the ports 236 may be configured for one protocol, whereas the ISL interface 237 may be configured for another protocol).

The resource optimization processor 220 may be any combination of hardware (e.g., a processor such as an integrated circuit or other circuitry) and software (e.g., machine or processor-executable instructions, commands, or code such as firmware, programming, or object code) to implement the functionalities of the processor 220 as described herein. This hardware and/or software that constitute (or instantiates) the resource optimization processor 220 may also be referred to herein as processing circuitry. Further, as used herein, the singular forms "a," "an," and "the" include plural referents unless the context clearly dictates otherwise, Thus, for example, the term "processor" is intended to mean at least one processor or a combination of processors. Thus, more than one resource optimization processor 220 may be included. The resource optimization processor 220 of router 210 can include at least one machine-readable storage medium and at least one computer processor. For example, software that provides the functionality of the processor 220 on router 210 can be stored on a memory device 212 of the router 210 to be executed by a processor of router 210.

The resource optimization processor 220 is configured to optimize hardware resources by selectively disabling the ISL between the peer routers (e.g., the ISL 130 in FIG. 1). More specifically, in some examples, the ISL is selectively disabled in response to multicast being enabled on the router 210. In addition, the resource optimization processor 220 is configured to selectively enable the ISL for certain interfaces based on various conditions. For example, the resource optimization processor 220 monitors the status of the links connected to the router 210 and the links connected to a peer router coupled to the router 210, e.g., the links 170 or 180 of FIG. 1. If the router 210 is currently acting as the primary router and the resource optimization processor 220 of the router 210 identifies a failure in of one of the links coupled to the router 210, then the resource optimization processor enables the ISL between the router 210 and a secondary peer router for the failed downstream link to ensure redundancy. In other words, in the context of FIG. 1, if one of the links 170 to the primary router 110A fails, then the ISL 130 is enabled specifically for the interface associated with link 170, whereas the ISL 130 remains disabled for other interfaces. The resource optimization processor 220 is further configured to determine if the number of failed downstream links to the primary router satisfies a threshold criterion (e.g., equals, exceeds, or equals-or-exceeds a threshold number). When the number of failed links to the primary router is identified as satisfying the threshold, router 210 (which is currently acting as the primary router) and the peer router connected thereto (which is currently acting as the secondary router) switch roles so that the router 210 becomes the secondary router and the peer router becomes the primary router. In other words, in the context of FIG. 1, if the number links 170 that have failed satisfies the threshold, then the router 110B becomes the primary router or DR and the router 110A operates as the secondary router or PR. In some examples, the threshold number is half of the total links connected to the primary router.

Example implementations of the operations described above, as well as additional operations that can be performed by the resource optimization processor 220 in some examples, are described in greater detail below with reference to FIGS. 3-6.

Although not shown, the router 210 may include additional processors, memories, or other hardware and software components. For example, router 210 may include a PIM module to allow for processing and routing of multicast flow packets received by the router 210. The PIM modules may, for example, program entries into the MRIB of the centralized database 225 based on received PIM messages (e.g., PIM joins).

FIG. 3 is a block diagram illustrating details of a router 310 storing instructions in accordance with examples described herein. The router 310 may be one example configuration of the routers 110 and 210 described above. The router 310 includes a resource optimization processor 320, which may be one example configuration of the resource optimization processor 220 described above with reference to FIG. 2. Some aspects of the router 310 may be similar to aspects of the router 210 already described above and duplicative description thereof is omitted. The router 310 may include additional components which are omitted from FIG. 3, such as a PIM module, a memory device storing a central database, and switching hardware, like those described above in relation to the router 210.

In the example router 310, the resource optimization processor 320 includes both a processing resource 306 and a memory 312. The resource optimization processor 320 may comprise, or may be instantiated on or by, processing resource 306 executing machine readable instructions to perform operations described herein. The processing resource 306 may execute instructions described below to perform the functions described herein.

The memory device 312 may be a machine readable storage medium or a non-transitory computer-readable medium and may store instructions 313, 314, 315, 316, and 317. As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and a secondary memory. The secondary memory can, for example, include a non-volatile memory where a copy of software or other data is stored.

The processing resource 306 may, for example, be in the form of a central processing unit (CPU), a semiconductor-based microprocessor, a digital signal processor (DSP) such as a digital image processing unit, or other hardware devices or processing elements suitable to retrieve and execute instructions stored in a storage medium such as the memory 312. The processing resource 306 may, for example, include single or multiple cores on a chip, multiple core across multiple chips or devices, or suitable combinations thereof. The processing resource 306 is configured to fetch, decode, and execute instructions stored in the memory 312 as described herein.

Instructions 313 may be executable by the processing resource 306 to disable and enable an ISL that connects the router 310 to a peer router, e.g., ISL 130 of FIG. 1. In some configurations, the ISL is enabled, for example when multicasting is not enabled, in order to support redundancy. However, in examples set forth herein, instructions are provided to initially disable the ISL 130 assuming that all links between the peer devices and downstream devices are active. In some examples, this disabling of the ISL may occur in response to multicast being enabled on the router 310. In other examples, this disabling of the ISL may occur as a default state regardless of whether multicast is enabled. More particularly, in examples set forth herein, resource optimization processor 320 disables the ISL 130 by enabling IGMP snooping. This may be done on an interface-by-interface basis; thus, disabling the ISL for all interfaces may comprise enabling IGMP snooping for all interfaces, and enabling the ISL for a given interface may comprise turning IGMP snooping off for that particular interface. IGMP snooping is an existing functionality in various multicast enabled devices, but one side effect of IGMP snooping in a VSX context is that, when enabled for a given interface, IGMP snooping prevents the duplication of multicast traffic for that interface to the ISL. Thus, the enabling of IGMP snooping prevents the flood of multicast data over the ISL that might otherwise occur. However, as will be further described below with respect to the methods performed herein, the instructions 313 also allow for turning off or disabling IGMP snooping for certain interfaces upon the failure of downstream links in order to ensure the flow of information between the peer routers 110 when the flow of information through one of the downstream links 170, 180 fails to occur. It should be noted that, in examples provided herein, the primary router enables the ISL 130 for the failed downstream link only and not for the downstream links that remain active. Thus, the secondary or proxy router will publish bridge entries to the MFIB for the failed VLAN only.

Instructions 314 to monitor downstream links 170, 180 may be executed by the processing resource 306 in response to the enabling of IGMP snooping and disabling of the ISL. In examples provided herein, the monitoring of the downstream links may occur through monitoring of a database storing link status. Other methods of monitoring the downstream link status are within scope of the disclosure.

Instructions 315 cause the processing resource 306 to determine a total number of failed links. More specifically, in some examples provided herein, the processing resource 306 determines a number of failed links from the primary router, e.g., failed links 170 between primary router 110A and the downstream devices 140. However, in some examples, the processing resource 306 of the secondary router 110B also determines a number of failed links 180 from the secondary router 110B to the downstream devices 140.

Instructions 316 cause the processing resource 306 to compare the number of failed links to a threshold. The threshold may be pre-determined and stored in a database. In some examples, the threshold is a set percentage of existing downstream links between the primary router and the downstream devices. The threshold may, for example, be 50%, but could alternatively be 45% or 55% or any other percentage appropriate to network characteristics. Thus, if five links exist between the primary router and the downstream devices and three of these links have failed as determined by instructions 315, the instructions 316 will cause the comparison of 3 out 5 existing links to the threshold of e.g., 50% and determine that the number of failed links meets the predetermined threshold.

Instructions 317 cause the processing resource 306 to change which router is the primary upon the determination that the number of failed links meets or exceeds the threshold percentage for failed links (per instructions 316). Accordingly, in examples provided herein, router 110B would become the primary router, and the router 110A becomes the secondary router. Further, upon switching of the primary router, the instructions 313 again disable the ISL for the primary downstream links, for example, by enabling IGMP snooping. The router functioning as the primary router is capable of monitoring both its own downstream links and the downstream links of its peer router. Thus, should links be restored, the router functioning as the primary router detects the restoration. The monitoring may be accomplished through a local or remote database.

As set forth above, both the primary router, e.g., 110A and the secondary router, e.g., 110B may store and execute the same instructions. However, each router 110 is aware of its status as secondary or primary and therefore only executes particular instructions when functioning as the primary router. For example, instructions to enable and disable the ISL and change the primary switch are executed by the processing resource 306 of the primary router. When the primary router makes the determination through instructions 317 that the secondary router should become the primary router, then the new primary router assumes control of enabling and disabling the ISL and changing the primary router.

Router 310 of FIG. 3, which is described in terms of engines containing hardware and software, can include one or more structural or functional aspects of the router 210 of FIG. 2. The routers 110, 210, 310 may be similar to one another. Such similar components may be referred to herein using the same last two digits (for example, memory 212). These similar components may be configured similarly, except when noted otherwise or where logically contradictory, and thus descriptions herein of such component may be applicable to the other similar components. Accordingly, duplicative descriptions of such components are omitted herein.

Figure 4:
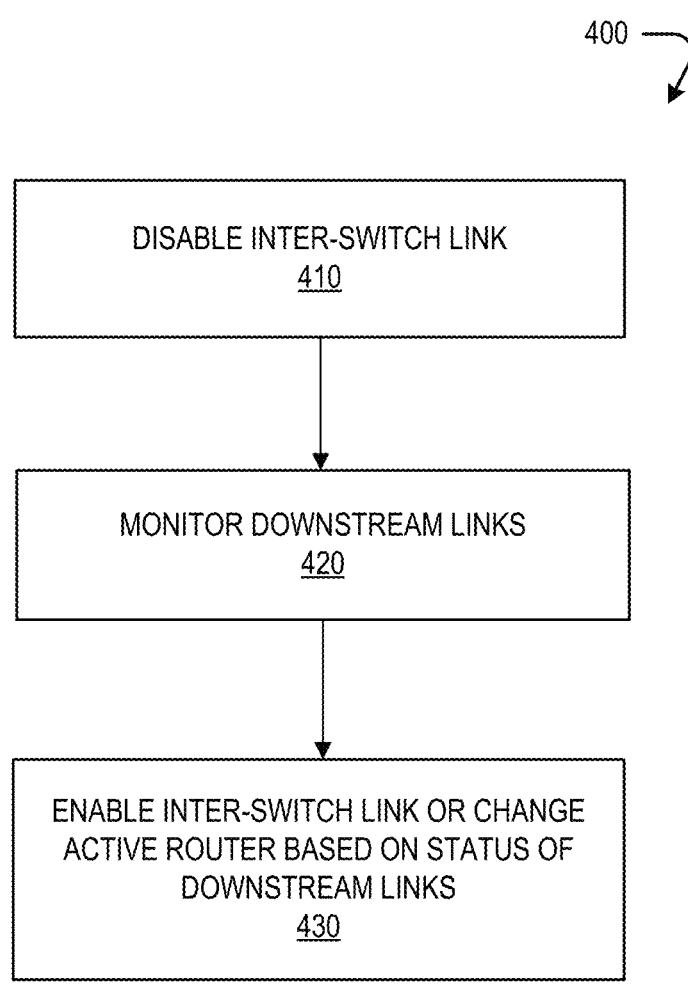
FIG. 4 is a flow diagram illustrating a method for optimizing resources in a multicast networking environment in accordance with examples set forth herein.

FIG. 4 is a flow diagram illustrating a method 400 for optimizing resources in a multicast network in accordance with examples set forth herein. Method 400 may be performed by, for example, router 110, 210, or 310. The method 400 may further be performed by a combination of processors. In some examples, the method is performed by one or more processors executing machine readable instructions that comprise, at least in part, instructions corresponding to the operations of method 400. For discussion purposes, as an example, method 400 is described as being performed by the router 110A while it functions as the primary router.

Method 400 starts in step 410, in which the primary router 110A disables the ISL 130 that connects the primary router 110A to its peer router 110B. In examples provided herein, router 110A disables the ISL 130 by activating IGMP snooping to prevent automatic flooding of received information from the router 110A to the router 110B over the ISL 130. Router 110A may also be referenced during this step as the designated router (DR) or first router. Router 110B may also be referenced during this step as the secondary router, proxy router (PR) or second router.

In step 420, router 110A monitors downstream links, such as links 170 from primary router 110A to downstream devices 140 to detect failure of these links. In examples provided herein, downstream devices 140 may report link failure to a system database (not shown) and the router 110A accesses the database to identify link failure. In other examples, the downstream devices may report link failure to the router 110A or its peer router 110B or to both routers 110A and 110B. In other examples, the downstream devices may report link failure to other devices in the network 104. In some examples, the router 110A may detect failure of a link directly (e.g., without relying on the report from a downstream device or peer router), for example, by detecting a loss of communications, electrical power, keep alive messages, or other signals associated with the link. The monitoring of the downstream link 170 includes identifying a failure of one or more downstream links 170 and further tracking a percentage or a number of available downstream links 170 that have failed.

In step 430, router 110A enables the ISL 130 or changes the primary router based on the status of the downstream links 170. For example, when router 110A identifies at least one failed downstream link, router 110A enables ISL 130 for the failed link to ensure replication and allow the flow of information from primary router 110A to secondary peer router 110B. It should be noted that, in examples provided herein, primary router 110A enables the ISL 130 for the failed downstream link only and not for the downstream links that remain active. Thus, the secondary or proxy router 110B will publish bridge entries to the MFIB for the failed VLAN only. Furthermore, router 110A may identify failure of a threshold number or threshold percentage of downstream links 170 that have failed and may become secondary based on meeting that threshold. When router 110A becomes secondary, peer router 110B becomes primary. Peer router 110B then performs the same operations described above in its role as the primary router.

Figure 5:
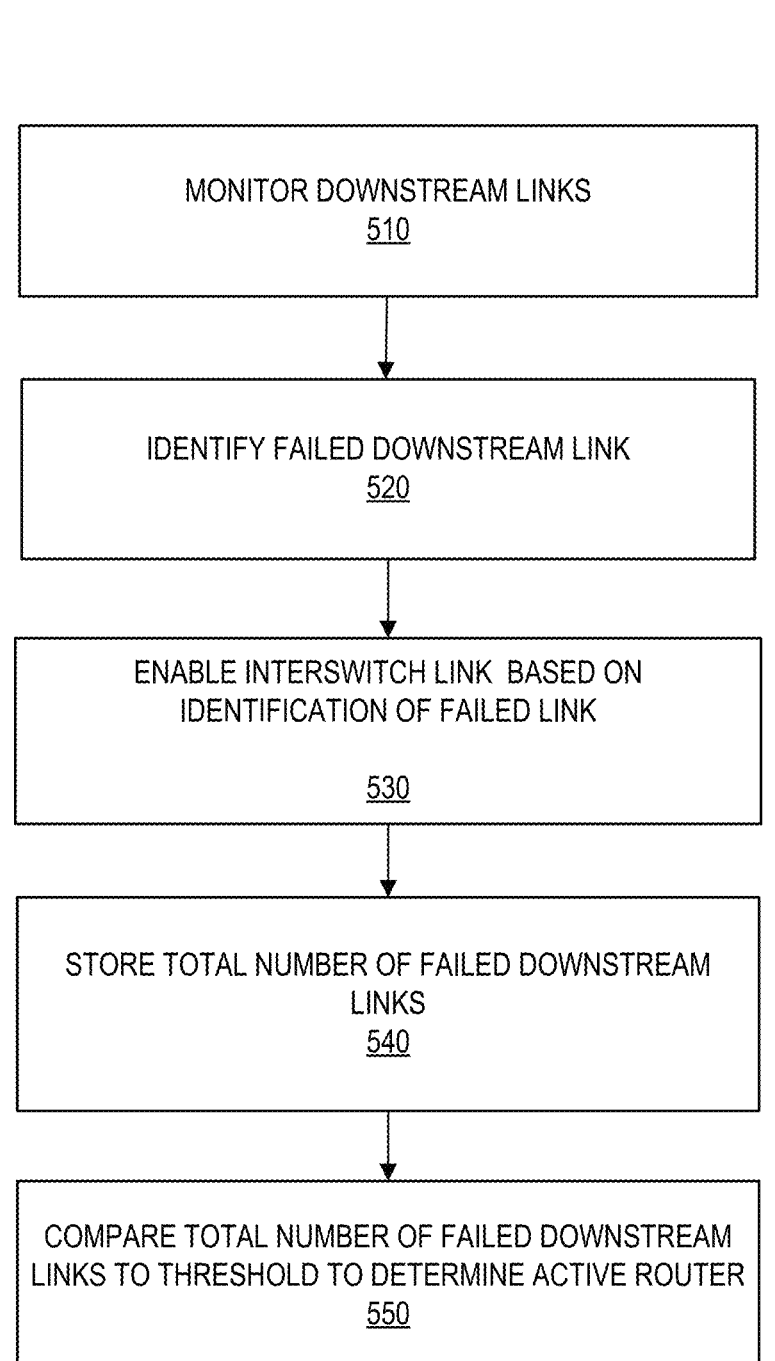
FIG. 5 is a flow diagram illustrating further details of a method for connecting optimizing resources in a multicast networking environment in accordance with examples set forth herein.

FIG. 5 is a flow diagram illustrating further details of a method 500 for optimizing resources in a multicast networking environment in accordance with examples set forth herein. Method 500 may be performed by routers 110, 210, or 310. The method 500 may further be performed by a combination of processors. In some examples, the method 500 is performed by one or more processors executing machine readable instructions that comprise, at least in part, instructions corresponding to the operations of method 500. For discussion purposes, as an example, method 500 is described as being performed by router 110. However, it should be understood that the steps may be performed by a processing engine of router 110, such as the resource optimization processor 120.

The method 500 provides a more specific example of portions of the method 400, as well as other operations. Specifically, the method 500 may be performed as a more detailed implementation of steps 420 and 430 of the method 400. In step 510, the primary switch 110A monitors downstream links 170. primary switch 110A begins to monitor the downstream links 170 upon disabling of the ISL 130 as described above with respect to FIG. 4.

In step 520, primary router 110A identifies a failed downstream link 170 between the primary router 110A and the downstream devices 140. As described above, various implementations may be utilized to identify failed downstream links. Upon identification of a single failed downstream link 170, primary router 110A enables the ISL 130 for the failed downstream link. Further, it should be noted that the router 110 enables the ISL 130 for a failed downstream link on each instance of detection of a failed downstream link. If primary router 110A initially disabled the ISL 130 by turning on IGMP snooping, then primary router 110A enables ISL by turning off IGMP snooping. It should be noted that, in examples provided herein, primary router 110A enables the ISL 130 for the failed downstream link only and not for the downstream links that remain primary. Thus, the secondary or proxy router 110B will publish bridge entries to the MFIB for the failed VLAN only. Other methods of enabling and disabling ISL 130 are within scope of the disclosure.

After the ISL 130 is enabled in step 530, primary router 110A continues to monitor downstream links 170 for further failures as described above. In examples provided herein, primary router 110A maintains or stores a total number of links in a failed state in step 540. Router 110A may also calculate a percentage of failed links based on the total number of failed links by dividing the number of failed links by a total number of provided links and may store the percentage.

In step 550, primary router 110A compares a total number of failed downstream links 170 or a percentage of failed downstream links from the primary router 110A to the downstream devices 140 to a predetermined threshold number or percentage. The predetermined threshold may be set in advance based on network characteristics. For example, if there are six total downstream links 170 and three of those downstream links have failed, primary router 110 would compare the 50% of failed downstream links to the predetermined threshold percentage.

Figure 6:
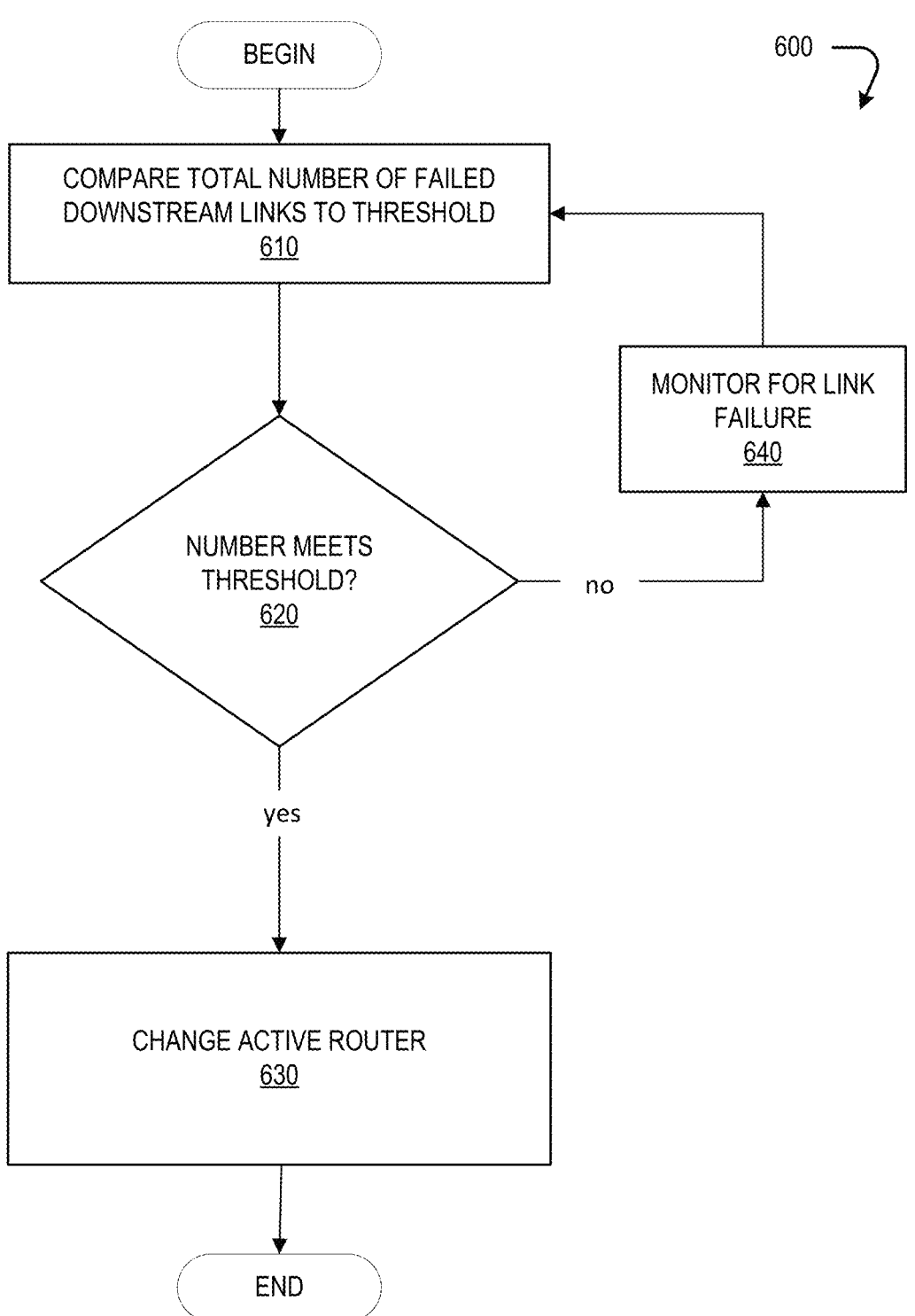
FIG. 6 is a flow diagram illustrating further details of a method for optimizing resources in a multicast networking environment in accordance with examples set forth herein.

FIG. 6 is a flow diagram illustrating details of a method 600 for optimizing resources in a multicast network in accordance with examples set forth herein. Method 600 may be performed by any suitable processor of router 110, 210, 310. The method 600 may further be performed by a combination of processors. In some examples, the method is performed by one or more processors executing machine readable instructions that comprise, at least in part, instructions corresponding to the operations of method 600. For discussion purposes, as an example, the method 600 is described as being performed by the router 110A and it should be understood that the method is being performed by a resource optimization processor 120, 220, 320 of the router 110A.

The method 600 provides a more specific example of portions of the method 400, as well as other operations. Specifically, the method 600 may be performed as a more detailed implementation of blocks 420 and 430 of the method 400.

In step 610, the primary router 110A compares a total number of failed downstream links 170 from primary router 110A to the downstream devices 140 to the predetermined threshold described above. If the total number or percentage of failed links meets or exceeds the threshold, then the peer secondary router 110B becomes the primary router and the primary router 110A becomes the secondary or proxy router in step 630.

However, if the number or percentage does not meet or exceed the threshold in step 620, the primary router continues to monitor for link failure in step 640. The comparison process repeats until the number or percentage of failed downstream links meets the threshold. Upon finding that the percentage or number of failed links meets or exceeds the threshold, the peer router becomes the primary router and the process ends or alternatively, the process repeats with the peer router as the primary router. Thus, the new primary router disables the ISL 130 for all primary downstream links, for example by enabling IGMP snooping. The router functioning as the primary router is capable of monitoring both its own downstream links and the downstream links of its peer router. Thus, should links be restored, the router functioning as the primary router detects the restoration. The monitoring may be accomplished through a local or remote database.

The methods, systems, devices, and equipment described herein may be implemented with, contain, or be executed by one or more computer systems. The methods described above may also be stored on a non-transitory computer-readable medium. Many of the elements may be, comprise, or include computers systems.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A method for resource optimization in a multicast network, the method comprising:

disabling, by a first network device, an inter-switch link (ISL) between the first network device functioning as a designated router and a second network device functioning as a proxy router to prevent a duplication of multicast traffic from the first network device to the second network device;

monitoring, by the first network device, downstream links between the first network device and downstream devices coupled to the first network device;

identifying, by the first network device, a failure of at least one downstream link coupled to the first network device; and determining, by the first network device, the ISL to be an egress port for traffic destined to the failed downstream link in response to identification of the failure.

2. The method of claim 1, further comprising disabling the ISL in response to multicast functionality being enabled on the first network device.

3. The method of claim 2, further comprising identifying a failure of a threshold number of downstream links from the first network device to the downstream devices and, in response, functioning as the proxy router.

4. The method of claim 3, further comprising disabling the ISL for traffic destined to the failed downstream link in response to the first network device functioning as the proxy router.

5. The method of claim 1, wherein disabling the ISL comprises enabling Internet Group Management Protocol (IGMP) snooping on the first network device.

6. The method of claim 1, wherein disabling the ISL comprises disabling duplication of multicast traffic to the ISL for each interface of the first network device.

7. The method of claim 1, wherein determining the ISL to be an egress port comprises enabling duplication of multicast traffic to the ISL for an interface of the first network device associated with the failed downstream link.

8. A network device functioning as a designated router in a multicast network, the network device comprising:

a processor; and a non-transitory computer-readable storage medium storing instructions, which when executed by the processor cause the processor to perform a method, the method comprising:

disabling an inter-switch link (ISL) between the network device and a peer network device functioning as a proxy router to prevent a duplication of multicast traffic from the network device to the peer network device;

monitoring the downstream links between the network device and downstream devices coupled to the network device;

identifying a failure of at least one downstream link coupled to the network device; and determining the ISL to be an egress port for traffic destined to the failed downstream link upon identification of the failure.

9. The network device of claim 8, further comprising switching hardware and a centralized database to program the switching hardware.

10. The network device of claim 8, wherein the method further comprises identifying a failure of a threshold number of downstream links from the network device to the downstream devices and in response, functioning as the proxy router.

11. The network device of claim 8, wherein the method further comprises disabling the ISL in response to multicast functionality being enabled on the network device.

12. The network device of claim 8, wherein disabling the ISL comprises enabling Internet Group Management Protocol (IGMP) snooping on the network device.

13. The network device of claim 8, wherein disabling the ISL comprises disabling duplication of multicast traffic to the ISL for each interface of the network device.

14. The network device of claim 13, wherein determining the ISL as an egress port comprises enabling duplication of multicast traffic to the ISL for an interface associated with the failed downstream link.

15. A non-transitory computer-readable medium storing instructions executable by a processor of a network device to cause the processor to perform a method, the method comprising:

disabling an inter-switch link (ISL) between the network device functioning as a designated router and a peer network device functioning as a proxy router to prevent a duplication of multicast traffic from the network device to the second network device;

monitoring downstream links between the network device and downstream devices coupled to the network device;

identifying a failure of at least one downstream link coupled to the network device; and determining the ISL to be an egress port for traffic destined to the failed downstream link upon identification of the failure.

16. The non-transitory computer-readable medium of claim 15, wherein the method further comprises identifying a failure of a threshold number of downstream links from the network device to the downstream devices and, in response, functioning as the proxy router.

17. The non-transitory computer-readable medium of claim 15, wherein the method further comprises disabling the ISL in response to multicast functionality being enabled on the network device.

18. The non-transitory computer-readable medium of claim 15, wherein disabling the ISL comprises enabling Internet Group Management Protocol (IGMP) snooping on the network device.

19. The non-transitory computer-readable medium of claim 15, wherein disabling the ISL comprises disabling duplication of multicast traffic to the ISL for each interface of the network device.

20. The non-transitory computer-readable medium of claim 15, wherein determining the ISL to be an egress port comprises enabling duplication of multicast traffic to the ISL for an interface of the network device associated with the failed downstream link.

* * * * *